(12) United States Patent
Berkman et al.

(10) Patent No.: US 8,626,776 B1
(45) Date of Patent: Jan. 7, 2014

(54) ENHANCING CONTENT WITH QUERIES (75) Inventors: Omer Berkman, Hod-Hasharon (IL); Aviad Sharfshtein, Kfar-Saba (IL); Avinoam Rubenstain, Macabim (IL)

(73) Assignee: My6Sense Inc., Herzliya Pituach (IL)

( * ) Notice: Subject to any disclaimer, the term of this patent is extended or adjusted under 35 U.S.C. 154(b) by 0 days.

(21) Appl. No.: 13/589,374

(22) Filed: Aug. 20, 2012

(51) Int. Cl.
*G06F 17/30* (2006.01)

(52) U.S. Cl.
USPC .......................................... 707/749

(58) Field of Classification Search
USPC ................... 707/2, 3, 213, 749; 709/204–206
See application file for complete search history.

(56) References Cited

U.S. PATENT DOCUMENTS

| | | | |
|---|---|---|---|
| 6,526,440 B1 | 2/2003 | Bharat | |
| 6,529,903 B2 | 3/2003 | Smith et al. | |
| 6,678,681 B1 | 1/2004 | Brin | |
| 7,225,187 B2 | 5/2007 | Dumais et al. | |
| 7,281,008 B1 | 10/2007 | Lawrence et al. | |
| 8,145,623 B1 * | 3/2012 | Mehta et al. | 707/713 |
| 2003/0028631 A1 | 2/2003 | Rhodes | |
| 2007/0088687 A1 | 4/2007 | Bromm et al. | |
| 2011/0145333 A1 * | 6/2011 | Hind et al. | 709/205 |

* cited by examiner

*Primary Examiner* — Etienne Leroux (57) ABSTRACT

A computer implemented method for enhancing content with queries, the method comprising steps the computer is programmed to perform, the steps comprising: on a networked computer, recording information on a plurality of content items and previously issued queries, the information associating each one of the queries with a respective at least one of the content items, the query being a query issued by a computer user in context of the respective content item, receiving data on a content item destined for a computer user, and selecting at least one of the queries associated with the content items, for presentation with the content item destined for the computer user.

21 Claims, 7 Drawing Sheets

ENHANCING CONTENT WITH QUERIES

FIELD AND BACKGROUND OF THE INVENTION

The present invention relates to content accessed from a computing device, and, more particularly, but not exclusively to an apparatus and a method for enhancement of content accessed from a computing device, with selected queries.

Currently, a typical computer user downloads a variety of content items, such as articles on web sites such as Fox News, Wikipedia entries, Video clips, Computer games, etc., from the internet, on a daily basis.

In what follows, the computer user may engage on an associative information searching activity, in which the computer user chooses to further explore a certain subject discussed in the article, learn more about a person or phenomenon mentioned in the article, etc., by issuing a query on a webpage of a search engine service such as Yahoo® or Google®, etc.

Typically, in order to issue the query, the computer user opens a new session in the computer user's web browser (say a Microsoft® Explorer or Google® Chrome), and types one or more terms in a search box presented to the user on the webpage of the search engine.

The information searching activity is a manual, and often repetitive.

Further, the information searching activity may require some skill to determine keywords, phrases, and the like that will return optimally relevant results that the user may actually use.

Very often, keywords and phrases entered by a user with good intent, cause return of many links to information that is not relevant to what the user was actually searching for. Therefore much time is wasted sifting through data and refining and resubmitting keywords for additional searches.

SUMMARY OF THE INVENTION

According to one aspect of the present invention, there is provided a computer implemented method for enhancing content with queries, the method comprising steps the computer is programmed to perform. The steps comprise: on a networked computer, recording information on a plurality of content items and previously issued queries, the information associating each one of the queries with a respective at least one of the content items, the query being a query issued by a computer user in context of the respective content item, receiving data on a content item destined for a computer user, and selecting at least one of the queries associated with the content items, for presentation with the content item destined for the computer user.

Optionally, the selecting of the queries comprises selecting at least one query amongst queries that the recorded information associates with the content item destined for the computer user.

Optionally, the method further comprises finding a linkage between the received content item and at least one of the content items associated with queries, and selecting at least one of the queries associated with the content items having the linkage with the received content item, for presentation to the computer user that the content item is destined for.

According to a second aspect of the present invention, there is provided an apparatus for enhancing content with queries. The apparatus comprises: a networked computer, an information recorder, implemented on the networked computer, configured to record information on a plurality of content items and previously issued queries, the information associating each one of the queries with a respective at least one of the content items, the query being a query issued by a computer user in context of the respective content item, a content data receiver, in communication with the information recorder, configured to receive data on a content item destined for a computer user, and a query selector, in communication with the content data receiver, configured to select at least one of the queries associated with the content items, for presentation with the content item destined for the computer user.

Optionally, the query selector is further configured to select at least one query amongst queries that the recorded information associates with the content item destined for the computer user.

Optionally, the apparatus further comprises a linkage finder, in communication with the query selector, configured to find a linkage between the received content item and at least one of the content items associated with queries, and the query selector is further configured to select at least one of the queries associated with the content items having the linkage with the received content item, for presentation to the computer user that the content item is destined for.

According to a third aspect of the present invention, there is provided a computer readable medium storing computer executable instructions or performing steps of syndicated data stream content provisioning. The steps comprise: on a networked computer, recording information on a plurality of content items and previously issued queries, the information associating each one of the queries with a respective at least one of the content items, the query being a query issued by a computer user in context of the respective content item, receiving data on a content item destined for a computer user, and selecting at least one of the queries associated with the content items, for presentation with the content item destined for the computer user.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

The present embodiments comprise an apparatus, method, and computer readable medium, for enhancing content with queries.

Currently, an enormous quantity of content is distributed over the internet through a variety of channels, say in many thousands of applications offered for sale or free distribution, on application distribution systems such as the Apple™ App Store or the Amazone™ App Store, on news web sites, in RSS (Really Simple Syndication) feeds etc.

Very often, when a computer user reads through a content item such as a report on a news web site, or watches a content item such as a YouTube™ video clip, the user wishes to search for more information on a certain person, story, place, etc., which appears in the content item, or for information that bears an associative connection to such information, in the user's mind.

To find the information, the user typically opens one of the popular search engine web sites (say Google™ or Bing™) in a separate page or session on his computer (say by opening a new session in a web browser such as Google™ Chrome or Microsoft® Internet Explorer).

Then, the user manually types a query in a search box available on the search engine web site and issues the query to the search engine, which in turn presents several results to the computer user.

Very often, at that stage, the user's attention is diverted to one of several results provided by the search engine, and the user closes the session in which the content item is presented, say by closing a specific application or a web page on which the content item is presented.

According to exemplary embodiments of the present invention, a content item destined for a user of a computing device and received through a service implemented using an exemplary apparatus, as described in further detail hereinbelow, or directly on the user's device, is automatically enhanced with one or more queries.

Consequently, the queries may be presented to the computer user together with the content item (say by presenting the two, side by side, on a web page communicated to the computer user), thus potentially, providing the user with a personal content enrichment and increasing mobile application engagement.

According to the exemplary embodiments, the enhancement is based on information which associates between previously presented content items and queries issued by the computer user, other computer users, or both.

The association is based on context. Thus, a query may be associated with a specific content item previously presented to a computer user, if the computer user issues the query upon being presented the specific content item.

For example, the information may associate a video interview with Ben Bernanke with queries issued by users in context of presentation of the video interview, say with a specific query for stock exchange data, a specific query on Bernanke's recent decisions or biographical data, etc.

Optionally, upon receipt of a content item destined for the computer user, there are selected one or more of the queries associated with the content item destined for the computer user, for presentation with the received content item, as described in further detail hereinbelow.

Optionally, upon receipt of a content item destined for the computer user, there is found a linkage between the received content item and one or more of the previously presented content items.

The linkage may be based on a category (say 'Nature', 'Football', etc.) that both content items are classifiable to, on terms common to both contents items, on bibliographic data (say author or magazine name) similarity, etc., as described in further detail hereinbelow.

Then, there are selected one or more queries that the information associates with the previously presented content items having that linkage with the received content item, for presentation to the computer user that the received content item is destined for, as described in further detail hereinbelow.

That is to say that a history of queries issued in context of content items presented to the user(s), serves as a basis to suggest queries to the user(s).

Consequently, queries previously issued in context of presentation of the content items, may be automatically put forward as recommendations to a computer user whenever a content item (new or already associated by the information) is later received on the user's computer.

For each content item received on the user's computer (say cellular phone), the queries put forward as recommendations, may include queries that the information associates with the received content item, queries that the information associates with content items having a linkage to the received content item, or both.

The later presented content item is thus enhanced with the previously issued queries.

In one example, the selected queries are presented to the computer user together with the content item in a search box, and the computer user may select one of the queries for issuance, modify the query, etc., as described in further detail hereinbelow. Subsequently, the information which serves as a basis for the enhancement is enriched with new information which associates the presented content item with the query issued per the user's selection.

The principles and operation of a method and an apparatus according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Figure 1:
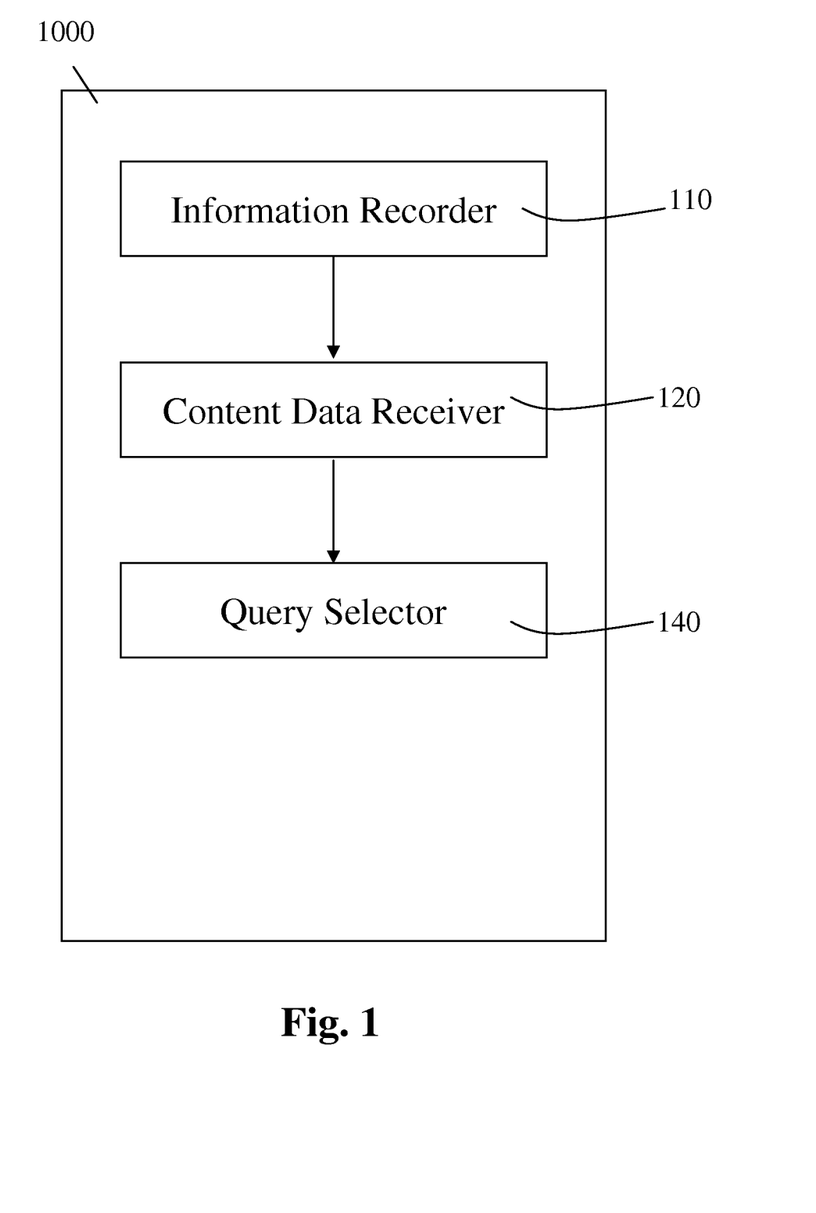
FIG. 1 is a simplified block diagram schematically illustrating a first apparatus for enhancing content with queries, according to an exemplary embodiment of the present invention.

Reference is now made to FIG. 1, which is a simplified block diagram schematically illustrating a first apparatus for enhancing content with queries, according to an exemplary embodiment of the present invention.

An apparatus 1000 for enhancing content with queries, according to an exemplary embodiment of the present invention, includes a network computer. The networked computer may be a single computer or a group of computers.

The apparatus further includes one or more additional parts 110-140. The parts 110-140 may be implemented as software, as hardware, or as a combination of hardware and software, as described in further detail hereinbelow.

Optionally, the network computer communicates with several computing devices (say smart phones in use by different users) remote from the network computer, through the internet, an intranet network, or another network, as described in further detail hereinbelow.

In one example, the apparatus 1000 serves as a part of a web based content provisioning service, say a cloud based service that multiple computer users (say smart phone or tablet computer users) subscribe to. Optionally, the users subscribe to the service by downloading an add-on (an accessory program that extends capabilities of an existing computer application) or another computer application to their computing device, as known in the art.

The apparatus 1000 includes an information recorder 110, implemented on the networked computer.

The information recorder 110 records information on content items and queries previously issued by at least one computer user (say a subscriber of the cloud based service). The information associates each one of the previously issued queries with a respective at least one of the content items, as described in further detail hereinbelow.

The association is based on context. Thus, a query may be associated with a specific content item previously presented to a computer user, if the computer user issues the query upon being presented the specific content item.

For example, the information may associate a video interview with Ben Bernanke with queries previously issued by at least one user (say one or more of the subscribers) in context of presentation of the video interview, say with a query for specific stock exchange prices, a specific query on Bernanke's recent decisions, etc.

Optionally, the computer user communicates with the apparatus 1000, using an add-on utility for mobile phone applications, say the add-on used for subscribing to the cloud based service, as described in further detail hereinabove.

When a content item (say a video or an article) is presented to the user, the user may choose to issue a query to a general user search engine like Google™, against files on the user's own computer, to a search engine internal to apparatus 1000, which runs on a database of content items associated by the information, etc.

Consequently, the add-on communicates information on the query and the content item in context of which the query is issued, to the apparatus 1000.

Optionally, the information recorder 110 records the communicated information in a dedicated database (not show).

Further, in the database, the recorded information may be indexed according to a variety of criterions, say by user name, IP address, geographical area, time of day, etc.

The apparatus 1000 further includes a content data receiver 120, in communication with the information recorder 110.

The content data receiver 120 receives data on a content item destined for a computer user.

In one example, the content item destined for the user is a content item received on the user's smart phone on which the add-on is installed and the add-on sends the data on the received content item, to the content data receiver 120.

The data may include, but is not limited to: the content item itself, a selected part of the content item, bibliographic data of the content item, origin of the content item, a list of terms that appear in the content item, etc., or any combination thereof.

The apparatus 1000 further includes a query selector 140, in communication with the content data receiver 120.

The query selector 140 selects one or more of the queries associated with the content items, for presentation with the content item destined for the computer user, as described in further detail hereinbelow.

Optionally, the query selector 140 selects one or more queries amongst queries that the recorded information associates with the content item destined for the computer user, as described in further detail hereinbelow.

Optionally, as a part of the selection, the query selector 140 ranks the queries associated with the content item destined for the computer user, according to popularity among a population of computer users. The popularity may relate to a predefined time frame, say to the recent month or year, or be a popularity not limited to a specific time frame. Then, the query selector 140 selects a predefined number of highest ranked ones of the queries for the presentation to the computer user that the content item is destined for, as described in further detail hereinbelow.

Optionally, as a part of the selection, the query selector 140 ranks the queries associated with the content item destined for the computer user, according to usage by the computer user that the content item is destined for. The usage relied on may relate to a predefined time frame, say the recent month or year, or be not limited to a specific time frame.

In one example, as a part of the selection, the query selector 140 ranks the queries according to a number of times that a specific user issues the specific query in general, a number of times that the specific user issues the specific query when a specific content item associated with the query is presented to the specific user, etc., as described in further detail hereinbelow. Then, the query selector 140 selects a predefined number of highest ranked ones of the queries for the presentation, as described in further detail hereinbelow.

Optionally, as a part of the selection, the query selector 140 ranks the queries associated with the content item destined for the computer user, according to a count of occurrences of one (or more) terms of each one of the associated queries in all the associated queries. Then, the query selector 140 selects a predefined number of highest ranked ones of the queries for the presentation, as described in further detail hereinbelow.

That is to say that the query selector 140 may rank the queries, by counting occurrences of one (or more) specific terms of each query associated with the content item destined for the computer user, in a population made of all the queries associated with the content item destined for the computer user.

The query selector 140 may rank the queries according to a sum, an average, or any other score calculated by the query selector 140 using the count of the occurrences of the terms of each of the queries in the population of all the queries associated with the content item destined for the computer user.

Optionally, as a part of the selection, the query selector 140 filters out any one of the queries that has less than a predefined number of terms in common with the received content item that is destined for the computer user.

Optionally, the apparatus 1000 further includes a query presenter (not shown), in communication with the query selector 140.

The query presenter presents the selected queries together with the received content item, to the computer user that the content item is destined for, say in a search box positioned aside the content item that is presented to the user, as described in further detail hereinbelow.

Optionally, the apparatus 1000 further includes a query forwarder (not shown), in communication with the query presenter.

The query forwarder is operable by the computer user, for forwarding one or more of the queries presented to the user by the query presenter, to a search engine.

The search engine may include, but is not limited to: a general purpose internet search engine (such as Google©), a search engine internal to the apparatus 1000, a search engine internal to the user's computer (say a Microsoft® Windows Explorer search bar), etc., as known in the art.

Optionally, the search engine is specific to a particular web site (say a search engine specific to a web site which provides for product searching in an on-line catalog), etc., as known in the art.

Subsequently, the add-on may communicate new information which associates the presented content item with the query forwarded to the search engine to the information recorder 110. The information recorder 110 adds the new information to the information which associates previously issued queries with content items, as described in further detail hereinabove.

Figure 2:
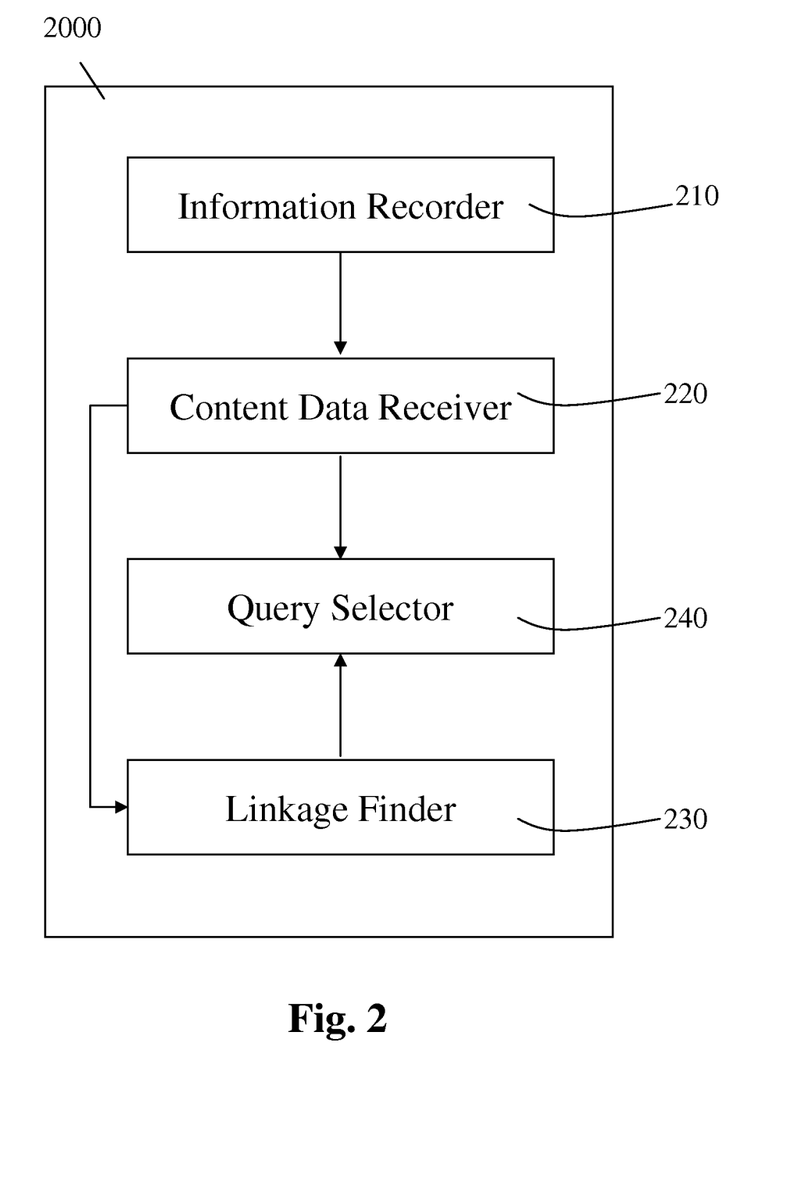
FIG. 2 is a simplified block diagram schematically illustrating a second apparatus for enhancing content with queries, according to an exemplary embodiment of the present invention.

Reference is now made to FIG. 2, which is a simplified block diagram schematically illustrating a second apparatus for enhancing content with queries, according to an exemplary embodiment of the present invention.

An apparatus 2000 for enhancing content with queries, according to an exemplary embodiment of the present invention, includes a network computer. The networked computer may be a single computer or a group of computers.

The apparatus further includes one or more additional parts 210-240. The parts 210-240 may be implemented as software, as hardware, or as a combination of hardware and software, as described in further detail hereinbelow.

Optionally, the network computer communicates with several computing devices (say smart phones or tablet computers in use by different users) remote from the network computer, through the internet, an intranet network, or another network, as described in further detail hereinbelow.

In one example, the apparatus 2000 serves as a part of a web based content provisioning service, say a cloud based service that multiple computer users (say smart phone users) subscribe to. Optionally, the users subscribe to the service by downloading an add-on or another computer application to their computing device, as known in the art.

The apparatus 2000 includes an information recorder 210, implemented on the networked computer.

The information recorder 210 records information on content items and queries previously issued by at least one computer user (say a subscriber of the cloud based service). The information associates each one of the previously issued queries with a respective at least one of the content items, as described in further detail hereinbelow.

The association is based on context. Thus, a query may be associated with a specific content item previously presented to a computer user, if the computer user issues the query upon being presented the specific content item.

For example, the information may associate a video interview with Ben Bernanke with queries previously issued by at least one user (say one or more of the subscribers) in context of presentation of the video interview, say with a query for specific stock exchange prices, a specific query on Bernanke's recent decisions, etc.

Optionally, the computer user communicates with the apparatus 2000, using an add-on utility for mobile phone applications, say the add-on used for subscribing to the cloud based service, as described in further detail hereinabove.

When a content item (say a video or an article) is presented to the user, the user may choose to issue a query to an internet search engine such as Google™, against files on the user's own computer, to a search engine internal to apparatus 2000, etc, as described in further detail hereinabove. Consequently, the add-on communicates information on the query and the content item in context of which the query is issued, to the apparatus 2000.

Optionally, the information recorder 210 records the communicated information in a dedicated database (not show).

Further, in the database, the recorded information may be indexed according to a variety of criterions, say by user name, IP address, geographical area, time of day, etc.

The apparatus 2000 further includes a content data receiver 220, in communication with the information recorder 210.

The content data receiver 220 receives data on a content item destined for a computer user.

In one example, the content item destined for the user is a content item received on the user's smart phone on which the add-on is installed and the add-on sends the data on the received content item, to the content data receiver 220.

The data may include, but is not limited to: the content item itself, a selected part of the content item, bibliographic data of the content item (say a author name), origin of the content item, a list of terms that appear in the content item, etc., or any combination thereof.

The apparatus 2000 further includes a linkage finder 230, in communication with the content data receiver 220.

Using the received data, the linkage finder 230 finds a linkage between the received content item and one or more of the content items that the information recorded by the information recorder 210 associates with the previously issued queries, as described in further detail hereinabove.

The linkage may be based on a category (say 'Nature', 'Football', etc.) that both content items are classifiable to, on terms common to both contents items, on bibliographic data (say author or magazine name) similarity between the content items, etc., as described in further detail hereinbelow.

In a first example, the linkage finder 230 may classify the received content item into one or more predefined categories that a content item associated with one of the previously issued queries also belongs to, as a part of finding the linkage, as described in further detail hereinbelow. In the example, a Judo Fight Video may be classified into a category of 'Fighting Sports' and thus found to have a linkage to a Bruce Lee movie and a PDF version of a Kong-Fu book—both classified into the same category of 'Fighting Sports'.

In a second example, the linkage finder 230 finds all content items that have at least a predefined number terms in common with the received content item, to have the linkage with the received content item.

In a third example, the linkage finder 230 measures term based similarity between the received content item and one (or more) of the content items associated with the queries, as a part of finding the linkage between the two (or more) content items.

The similarity measurement may be based on digital information representation and retrieval methods, as known in the art. The methods include but are not limited to: asymmetric Kullback-Leibler divergence between language model representations of content items (say a set of terms of each content item), angles between vector representations (say the terms) of the content items, standard to area of information retrieval, etc, as known in the art.

Optionally, for finding the linkage, the linkage finder 230 uses parts of the data on the destined content item that directly link the destined content item to other content items. The parts may include bibliographical data, hyperlinks, or other parts that are added to the content item by the item's publisher, as known in the art.

In one example, the linkage finder 230 uses hyperlinks in a CNN web site article, that link the article to another CNN article, for finding the linkage, provided that the other article is an item previously presented to a subscriber of the cloud based service (as indicated by the information recorded by the information recorder 210).

The apparatus 2000 further includes a query selector 240, in communication with the content data receiver 220 and the linkage finder 230.

The query selector 240 selects one or more of the queries associated with the content items having the linkage with the received content item, for presentation to the computer user that the content item is destined for.

Optionally, as a part of the selection, the query selector 240 ranks the queries associated with the content items having the linkage, according to popularity among a population of computer users, say according to a count of times in which each of the associated queries is issued by the subscribers of the cloud based service.

The popularity may relate to a predefined time frame, say to the recent month or year, or be a popularity not limited to a specific time frame. Then, the query selector 240 selects a predefined number of highest ranked ones of the queries for the presentation to the computer user that the content item is destined for, as described in further detail hereinbelow.

Optionally, as a part of the selection, the query selector 240 ranks the queries associated with the content items having the linkage, according to usage by the computer user that the content item is destined for. The usage relied on may relate to a predefined time frame, say the recent month or year, or be not limited to a specific time frame.

Optionally, as a part of the selection, the query selector 240 ranks the queries according to a number of times that a specific user issues the specific query in general, a number of times that the specific user issues the specific query when a specific content item associated with the query is presented to the specific user, etc., as described in further detail hereinbelow. Then, the query selector 240 selects a predefined number of highest ranked ones of the queries for the presentation, as described in further detail hereinbelow.

Optionally, as a part of the selection, the query selector 140 ranks the queries associated with the content items having the linkage, according to a count of occurrences of one (or more) terms of each one of the associated queries in all the associated queries. Then, the query selector 240 selects a predefined number of highest ranked ones of the queries for the presentation, as described in further detail hereinbelow.

That is to say that the query selector 240 may rank the queries, by counting occurrences of one (or more) specific terms of each query associated with the content items having the linkage, in a population made of all the queries associated with the content items having the linkage.

The query selector 240 may rank the queries according to a sum, an average, or any other score calculated by the query selector 240 using the count of the occurrences of the terms of each of the queries in the population of all the queries associated with the content items having the linkage.

Optionally, as a part of the selection, the query selector 240 filters out any one of the queries that has less than a predefined number of terms in common with the received content item that is destined for the computer user.

Optionally, the apparatus 2000 further includes a query presenter (not shown), in communication with the query selector 240.

The query presenter presents the selected queries together with the received content item, to the computer user that the content item is destined for, say in a search box positioned aside the content item that is presented to the user, as described in further detail hereinbelow.

Optionally, the apparatus 2000 further includes a query forwarder (not shown), in communication with the query presenter.

The query forwarder is operable by the computer user, for forwarding one or more of the queries presented to the user by the query presenter, to a search engine. The search engine may include, but is not limited to: a general purpose internet search engine (such as Google©), a search engine internal to the apparatus 2000, a search engine internal to the user's computer (say a Microsoft® Windows Explorer search bar), etc., as known in the art.

Optionally, the search engine is specific to a particular web site (say a search engine specific to a web site which provides for product searching in an on-line catalog), etc., as known in the art.

Subsequently, the add-on may communicate new information which associates the presented content item with the query forwarded to the search engine to the information recorder 210. The information recorder 210 adds the new information to the information which associates previously issued queries with content items, as described in further detail hereinabove.

Figure 3:
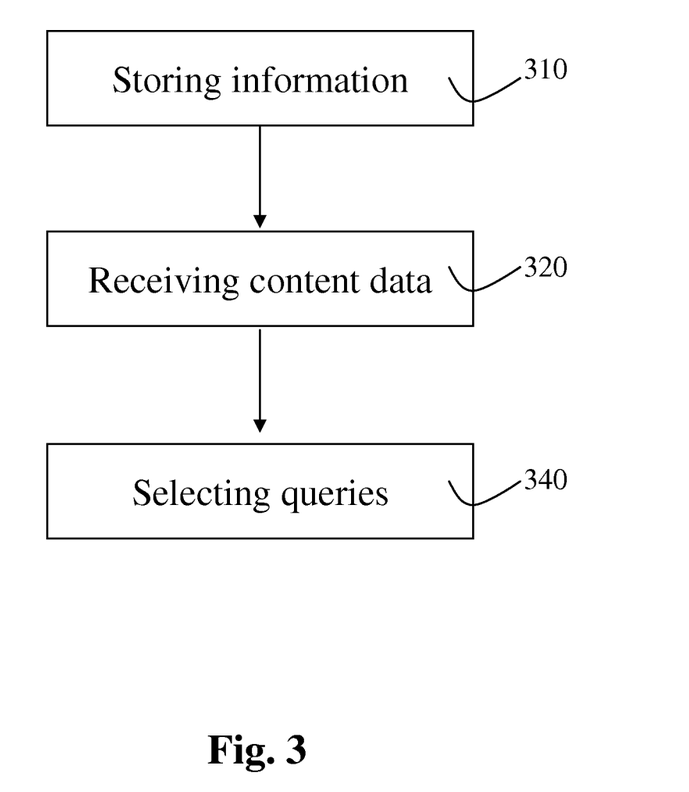
FIG. 3 is a simplified flowchart illustrating a first method for enhancing content with queries, according to an exemplary embodiment of the present invention.

Reference is now made to FIG. 3, which is a simplified flowchart illustrating a first method for enhancing content with queries, according to an exemplary embodiment of the present invention.

An exemplary method according to an exemplary embodiment of the present invention, may be implemented on a networked computer, such as a server computer in communication with multiple remote computing devices (say smart phones, tablet computers, or both), over the internet or another computer network.

In one example, the method is implemented as a part of a web based content provisioning service (say a cloud based service) that multiple computer users (say smart phone or tablet computer users) subscribe to. Optionally, the user subscribe to the service by downloading an add-on (an accessory program that extends capabilities of an existing computer application) or another computer application to their computing device, as known in the art.

In the exemplary method, there is recorded 310 information on content items and queries previously issued by at least one computer user (say a subscriber of the cloud based service), say by the information recorder 110 of apparatus 1000, as described in further detail hereinabove.

The recorded 310 information associates each one of the previously issued queries with a respective at least one of the content items.

The association is based on context. Thus, a query may be associated with a specific content item previously presented to a computer user, if the computer user issues the query upon being presented the specific content item.

Optionally, the computer user communicates with the apparatus 1000, using an add-on utility for mobile phone applications, say the add-on used for subscribing to the cloud based service, as described in further detail hereinabove.

When a content item (say a video or an article) is presented to the user, the user may choose to issue a query to a general user search engine like Google™, against files on the user's own computer, to a search engine internal to apparatus 1000, etc., as described in further detail hereinabove. Consequently, the add-on communicates information on the query and the content item in context of which the query is issued, to the apparatus 1000.

Optionally, the communicated information is recorded 310 in a dedicated database. The recorded 310 information associates between the content item presented to the computer user and the query issued by the computer user in the context of the presented content item.

For example, the information may associate a video interview with Ben Bernanke with queries previously issued by at least one user (say one or more of the subscribers), in context of presentation of the video interview, say with a query for specific stock exchange prices, a specific query on Bernanke's recent decisions, etc.

Further, the recorded 310 information may be indexed according to a variety of criterions, say by user name, IP address, geographical area, time of day, etc.

Later, there is received 320 data on a content item destined for a computer user.

In one example, the content item destined for the user is a content item received on the user's smart phone on which the add-on in installed, and the add-on sends data on the received content item, to the content data receiver 120.

The data may include, but is not limited to: the content item itself, a selected part of the content item, bibliographic data of the content item, origin of the content item, a list of terms that appear in the content item, etc., or any combination thereof.

Upon receipt 320 of the data on the content item destined for the computer user, there are selected 340 one or more of the queries associated with the content items, for presentation with the content item destined for the computer user, say by the query selector 140, as described in further detail hereinbelow.

Optionally, there are selected 340 one or more queries amongst queries that the recorded 310 information associates with the content item destined for the computer user, as described in further detail hereinbelow.

Optionally, as a part of the selection 340, queries associated with the content item destined for the computer user, are ranked according to popularity among a population of computer users, say according to a count of times in which each of the associated queries is issued by the subscribers of the cloud based service.

The popularity may relate to a predefined time frame, say to the recent month or year, or be a popularity not limited to a specific time frame. Then, there are selected 340 a predefined number of highest ranked ones of the queries for the presentation to the computer user that the content item is destined for, as described in further detail hereinbelow.

Optionally, as a part of the selection 340, queries associated with the content item destined for the computer user, are ranked according to usage by the computer user that the content item is destined for. The usage relied on may relate to a predefined time frame, say the recent month or year, or be not limited to a specific time frame.

In one example, the queries are ranked, according to a number of times that a specific user issues the specific query in general, a number of times that the specific user issues the specific query when a specific content item associated with the query is presented to the specific user, etc., as described in further detail hereinbelow. Then, there are selected 340 a predefined number of highest ranked ones of the queries for the presentation, as described in further detail hereinbelow.

Optionally, as a part of the selection 340, queries associated with the content item destined for the computer user, are ranked according to a count of occurrences of one (or more) terms of each one of the associated queries in all the associated queries. Then, there are selected 340 a predefined number of highest ranked ones of the queries for the presentation, as described in further detail hereinbelow.

That is to say that the queries may be ranked, by counting occurrences of one (or more) specific terms of each query associated with the content item destined for the computer user, in a population made of all the queries associated with the content item destined for the computer user, as described in further detail hereinbelow.

Optionally, as a part of the selection 340, the queries are ranked according to a sum, an average, or any other score calculated by the query selector 140 using the count of the occurrences of the terms of each of the queries in the population of all the queries associated with the content item destined for the computer user.

Optionally, as a part of the selection 340, any one of the queries that has less than a predefined number of terms in common with the received content item that is destined for the computer user, is filtered out, as described in further detail hereinabove.

Optionally, the selected 340 queries are presented together with the received content item, to the computer user that the content item is destined for, say by the query presenter of apparatus 1000. For example, the selected 340 queries may be presented in a search box positioned aside the content item that is presented to the user, as described in further detail hereinbelow.

Optionally, the computer user is allowed to forward one or more of the presented queries, to an internet search engine such as Google©, to a search engine internal to the apparatus 1000, etc., say by the query forwarder of apparatus 1000, as described in further detail hereinbelow.

Subsequently, the add-on may communicate new information which associates the presented content item with the query forwarded to the search engine, say to the information recorder 110 of apparatus 1000. The information recorder 110 adds the new information to the information which associates previously issued queries with content items, as described in further detail hereinabove.

Figure 4:
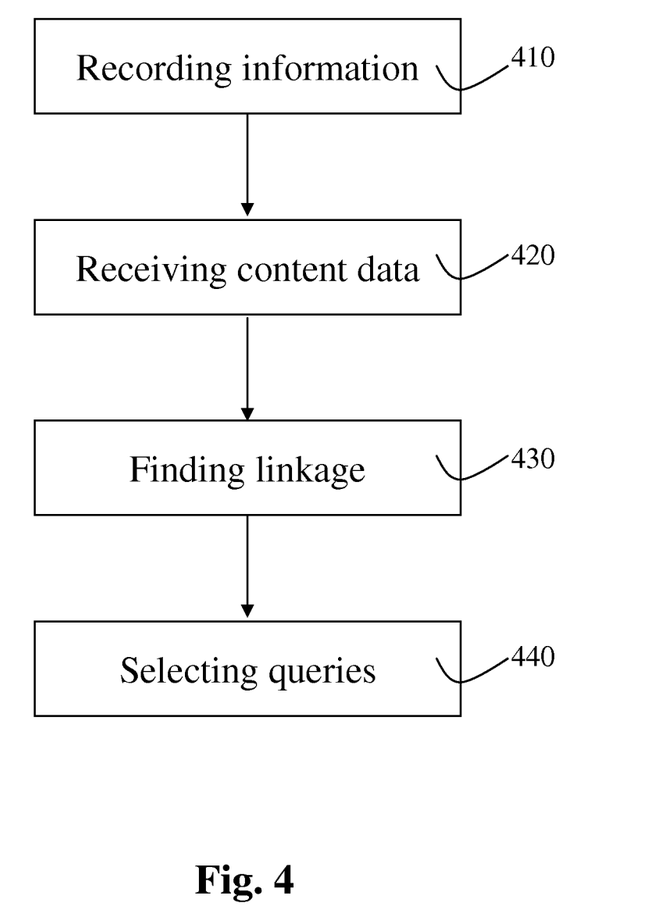
FIG. 4 is a simplified flowchart illustrating a second method for enhancing content with queries, according to an exemplary embodiment of the present invention.

Reference is now made to FIG. 4, which is a simplified flowchart illustrating a second method for enhancing content with queries, according to an exemplary embodiment of the present invention.

An exemplary method according to an exemplary embodiment of the present invention, may be implemented on a networked computer, such as a server computer in communication with multiple remote computing devices (say smart phones, tablet computers, or both), over the internet or another computer network.

In one example, the method is implemented as a part of a web based content provisioning service (say a cloud based service) that multiple computer users (say smart phone or tablet computer users) subscribe to. Optionally, the users subscribe to the service by downloading an add-on (an accessory program that extends capabilities of an existing computer application) or another computer application to their computing device, as known in the art.

In the exemplary method, there is recorded 410 information on content items and queries previously issued by at least one computer user (say a subscriber of the cloud based service), say by the information recorder 210 of apparatus 2000, as described in further detail hereinabove.

The information associates each one of the previously issued queries with a respective at least one of the content items.

The association is based on context. Thus, a query may be associated with a specific content item previously presented to a computer user, if the computer user issues the query upon being presented the specific content item.

Optionally, the computer user communicates with the apparatus 2000, using an add-on utility for mobile phone applications, say the add-on used for subscribing to the cloud based service, as described in further detail hereinabove.

When a content item (say a video or an article) is presented to the user, the user may choose to issue a query to an internet search engine like Google™, against files on the user's own computer, etc., as described in further detail hereinabove. Consequently, the add-on communicates information on the query and the content item in context of which the query is issued, to the apparatus 2000.

Optionally, the communicated information is recorded 410 in a dedicated database. The recorded 410 information associates between the content item presented to the computer user and the query issued by the computer user in the context of the presented content item.

For example, the information may associate a video interview with Ben Bernanke with queries previously issued by at least one user (say one or more of the subscribers), in context of presentation of the video interview, say with a query for specific stock exchange prices, a specific query on Bernanke's recent decisions, etc.

Further, the recorded 410 information may be indexed according to a variety of criterions, say by user name, IP address, geographical area, time of day, etc.

Later, there is received 420 data on a content item destined for a computer user.

In one example, the content item destined for the user is a content item received on the user's smart phone on which the add-on in installed, and the add-on sends data on the received content item, to the content data receiver 220.

The data may include, but is not limited to: the content item itself, a selected part of the content item, bibliographic data of the content item, origin of the content item, a list of terms that appear in the content item, etc., or any combination thereof.

Upon receipt 420 of the data on the content item, the received 420 data is used to find 430 a linkage between the received content item and one or more of the content items that the recorded 410 information associates with the previously issued queries, say by the linkage finder 230, as described in further detail hereinabove.

The linkage may be based on one or more categories (say 'Nature', 'Football', etc.) that both content items are classifiable to, on terms common to both contents items, on bibliographic data (say author or magazine name) similarity between the content items, etc., or any combination thereof, as described in further detail hereinbelow.

In a first example, the received content item is classified into a predefined category that a content item associated with one of the previously issued queries also belongs to, as a part of finding 430 the linkage, as described in further detail hereinbelow.

In the example, a Judo Fight Video is classified into a category of 'Fighting Sports' and thus found 430 to have a linkage to a Bruce Lee movie and a PDF version of a Kong-Fu book—both classified into the same category of 'Fighting Sports'.

Optionally, the classification of the received content item into the categories is based on a periodically learnt multi-label text classifier, such as the standard Naïve Bayes classifier and extensions, K-nearest neighbor, etc., as known in the art.

In a second example, all content items that have a predefined number of terms in common with the received content item, are found 430 to have the linkage with the received content item.

In a third example, there is measured term based similarity between the received content item and one (or more) of the content items associated with the queries, as a part of finding 430 the linkage between the two (or more) content items.

The similarity measurement may be based on digital information representation and retrieval methods, as known in the art. The methods include but are not limited to: asymmetric Kullback-Leibler divergence between language model representations of content items (say a set of terms of each content item), angles between vector representations (say the terms) of the content items, standard to area of information retrieval, etc, as known in the art.

Optionally, the finding 430 of the linkage involves use of parts of the data on the destined content item that directly link the destined content item to other content items. The parts may include bibliographical data, hyperlinks, or other parts that are added to the content item by the item's publisher, as known in the art.

For example, an hyperlink in a web site article, that links the article to another one of the web site's articles, may be used for finding 430 the linkage, provided that the other article is an article previously presented to a subscriber of the cloud based service (and thus a content item that a part of the recorded 410 information pertains to).

Next, there are selected 440 one or more of the queries associated with the content items having the linkage with the received content item, for presentation to the computer user that the content item is destined for, say by the query selector 240, as described in further detail hereinabove.

Optionally, as a part of the selection, the queries associated with the content items having the linkage, are ranked according to popularity among a population of computer users, say according to a count of times in which each of the queries is issued by subscribers of the cloud based service.

The popularity may be limited to a specific time frame (say the recent month or year) or not limited to a specific time frame. Then, there are selected 440 a predefined number of highest ranked ones of the queries for the presentation to the computer user that the content item is destined for, as described in further detail hereinbelow.

Optionally, as a part of the selection, the queries associated with the content items having the linkage, are ranked, according to usage by the computer user that the content item is destined for. The usage may pertain to a specific time frame (say the recent month or year) or rather be not limited to a specific time frame.

In one example, the queries are ranked according to a number of times that the specific computer user issues the specific query in general, a number of times that the user issues the specific query when a specific content item associated with the query is presented to the specific user, etc., as described in further detail hereinbelow.

Then, there are selected 440 a predefined number of highest ranked ones of the queries for the presentation, as described in further detail hereinbelow.

Optionally, as a part of the selection, the queries associated with the content items having the linkage, are ranked according to a count of occurrences of one (or more) terms of each one of the associated queries in all the associated queries.

That is to say that the queries may be ranked, by counting occurrences of one (or more) specific terms of each query associated with the content items having the linkage, in a population made of all the queries associated with the content items having the linkage.

The queries may be ranked according to a sum, an average, or any other score calculated (say by the query selector 240) using the count of the occurrences of the terms of each of the queries associated with the content items having the linkage, in the population of all the queries associated with the content items having the linkage.

Then, there are selected 440 a predefined number of highest ranked ones of the queries for the presentation, as described in further detail hereinbelow.

Optionally, as a part of the selection, any one of the queries that has less than a predefined number of terms in common with the received content item destined for the computer user, is filtered out, as described in further detail hereinabove.

Optionally, the selected 440 queries are presented together with the received content item, to the computer user that the content item is destined for, say by the query presenter of apparatus 2000. For example, the selected 440 queries may be presented in a search box positioned aside the content item that is presented to the user, as described in further detail hereinbelow.

Optionally, the computer user is allowed to forward one or more of the presented queries, to an internet search engine such as Google©, to a search engine internal to the apparatus 2000, etc., say by the query forwarder of apparatus 2000, as described in further detail hereinbelow.

Subsequently, the add-on may communicate new information which associates the presented content item with the query forwarded to the search engine, say to the information recorder 210 of apparatus 2000. The information recorder 210 adds the new information to the information which associates previously issued queries with content items, as described in further detail hereinabove.

Figure 5:
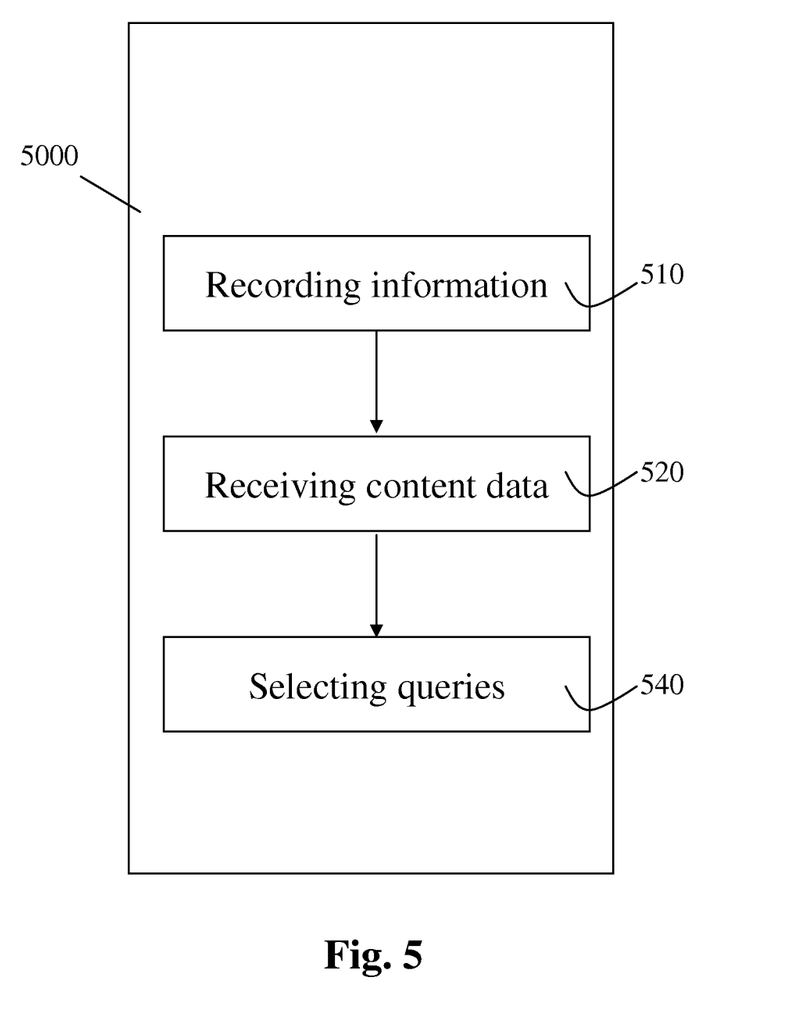
FIG. 5 is a simplified block diagram schematically illustrating a first computer readable medium for enhancing content with queries, according to an exemplary embodiment of the present invention.

Reference is now made to FIG. 5, which is block diagram schematically illustrating a first computer readable medium storing computer executable instructions for performing steps of enhancing content with queries, according to an exemplary embodiment of the present invention.

According to an exemplary embodiment of the present invention, there is provided a non-transitory computer readable medium 5000, such as a CD-ROM, a USB-Memory, a Portable Hard Disk, or a diskette.

The computer readable medium 5000 stores computer executable instructions, for performing steps of enhancing content with queries.

The instructions may executed upon a processor of a networked computer, such as a server computer in communication with multiple remote computing devices (say smart phones, tablet computers, or both), over the internet or another computer network.

In one example, upon execution on the computer's processor, the steps implement a part of a web based content provisioning service (say a cloud based service) that multiple computer users subscribe to. Optionally, the users subscribe to the service by downloading an add-on (an accessory program that extends capabilities of an existing computer application) or another computer application to their computing device, as known in the art.

The computer executable instructions include a step of recording 510 information on content items and queries previously issued by at least one computer user (say a subscriber of the cloud based service), as described in further detail hereinabove.

The information associates each one of the previously issued queries with a respective at least one of the content items.

The association is based on context. Thus, a query may be associated with a specific content item previously presented to a computer user, if the computer user issues the query upon being presented the specific content item.

Optionally, when a content item is presented to the user, the user may choose to issue a query to an internet search engine like Google™, to a search engine of the cloud based service, which runs on content items associated by the recorded 510 information, etc., as described in further detail hereinabove.

Consequently, an add-on communicates information on the issued query and the content item in context of which the query is issued, to the network computer.

Optionally, the communicated information is recorded 510 in a dedicated database. The recorded 510 information associates between the content item presented to the computer user and the query issued by the computer user in the context of the presented content item.

For example, the information may associate a video interview with Ben Bernanke with queries previously issued by at least one user (say one or more of the subscribers), in context of presentation of the video interview, say with a query for specific stock exchange prices, a specific query on Bernanke's recent decisions, etc.

Further, the recorded 510 information may be indexed according to a variety of criterions, say by user name, IP address, geographical area, time of day, etc.

The computer executable instructions further include a step of receiving 520 data on a content item destined for a computer user.

In one example, the content item destined for the user is a content item received on the user's smart phone on which the add-on in installed, and the add-on sends data on the received content item, to the network computer on which the instructions are executed.

The data may include, but is not limited to: the content item itself, a selected part of the content item, bibliographic data of the content item, origin of the content item, a list of terms that appear in the content item, etc., or any combination thereof.

The computer executable instructions include a step in which upon receipt 520 of the data on the content item destined for the computer user, there are selected 540 one or more of the queries associated with the content items, for presentation with the content item destined for the computer user, as described in further detail hereinabove.

Optionally, there are selected 540 one or more queries amongst queries that the recorded 510 information associates with the content item destined for the computer user, as described in further detail hereinbelow.

Optionally, as a part of the selection 540, queries associated with the content item destined for the computer user, are ranked according to popularity among a population of computer users, say among subscribers of the cloud based service, as described in further detail hereinabove.

The popularity may relate to a predefined time frame, say to the recent month or year, or be a popularity not limited to a specific time frame. Then, there are selected 540 a predefined number of highest ranked ones of the queries for the presentation to the computer user that the content item is destined for, as described in further detail hereinbelow.

Optionally, as a part of the selection 540, queries associated with the content item destined for the computer user, are ranked according to usage by the computer user that the content item is destined for. The usage relied on may relate to a predefined time frame, say the recent month or year, or be not limited to a specific time frame.

In one example, the queries are ranked, according to a number of times that a specific user issues the specific query in general, a number of times that the specific user issues the specific query when a specific content item associated with the query is presented to the specific user, etc., as described in further detail hereinbelow. Then, there are selected 540 a predefined number of highest ranked ones of the queries for the presentation, as described in further detail hereinbelow.

Optionally, as a part of the selection 540, queries associated with the content item destined for the computer user, are ranked according to a count of occurrences of one (or more) terms of each one of the associated queries in all the associated queries. Then, there are selected 540 a predefined number of highest ranked ones of the queries for the presentation, as described in further detail hereinbelow.

That is to say that the queries may be ranked, by counting occurrences of one (or more) specific terms of each query associated with the content item destined for the computer user, in a population made of all the queries associated with the content item destined for the computer user.

Optionally, as a part of the selection 540, the queries are ranked according to a sum, an average, or any other score which is calculated using the count of the occurrences of the terms of each of the queries in the population of all the queries associated with the content item destined for the computer user.

Optionally, as a part of the selection 540, any one of the queries that has less than a predefined number of terms in common with the received content item that is destined for the computer user, is filtered out, as described in further detail hereinbelow.

Optionally, the computer executable instructions further include a step in which the selected 540 queries are presented together with the received content item, to the computer user that the content item is destined for. For example, the selected 540 queries may be presented in a search box positioned aside the content item that is presented to the user, as described in further detail hereinabove.

Optionally, the computer executable instructions further include a step in which the computer user is allowed to forward one or more of the presented queries, to an internet search engine (say Google©), to a search engine internal to the service implemented using the instructions, etc, as described in further detail hereinabove.

Figure 6:
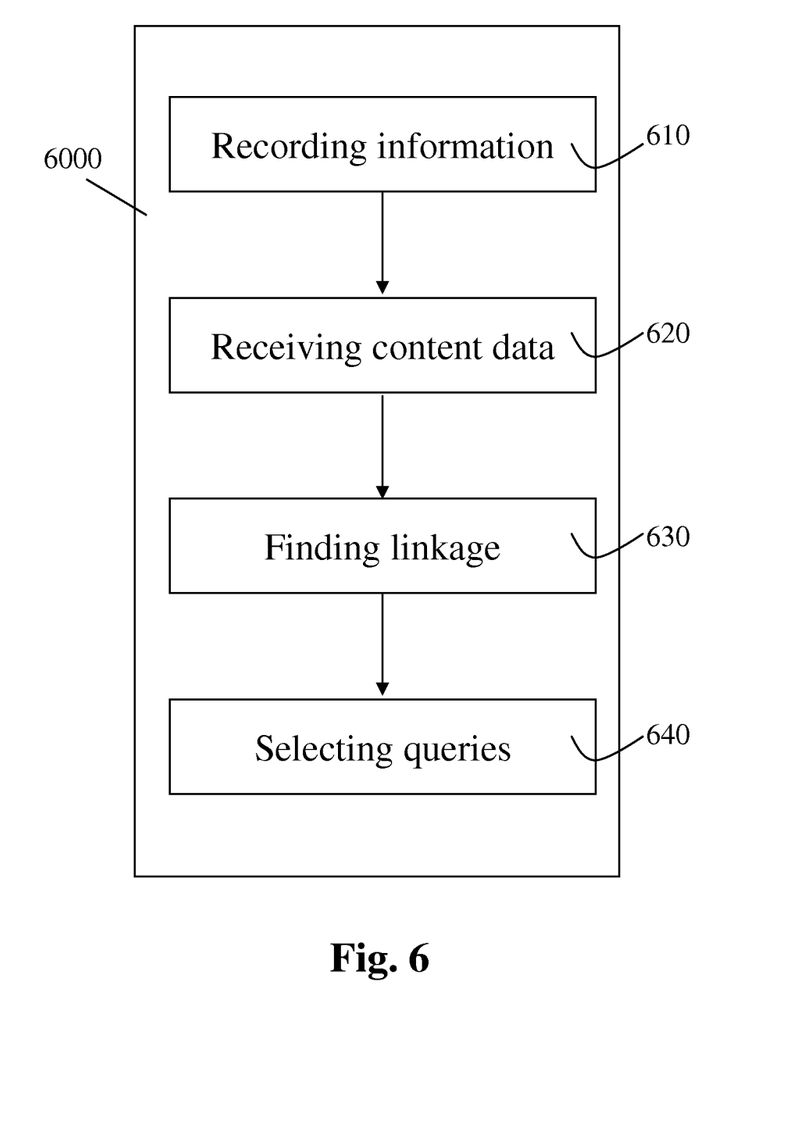
FIG. 6 is a simplified block diagram schematically illustrating a second computer readable medium for enhancing content with queries, according to an exemplary embodiment of the present invention.

Reference is now made to FIG. 6, which is block diagram schematically illustrating a second computer readable medium storing computer executable instructions for performing steps of enhancing content with queries, according to an exemplary embodiment of the present invention.

According to an exemplary embodiment of the present invention, there is provided a non-transitory computer readable medium 6000, such as a CD-ROM, a USB-Memory, a Portable Hard Disk, or a diskette.

The computer readable medium 6000 stores computer executable instructions, for performing steps of enhancing content with queries.

Optionally, the steps implement a part of a web based content provisioning service (say a cloud based service) that multiple computer users subscribe to.

Optionally, the users subscribe to the service by downloading an add-on (an accessory program that extends capabilities of an existing computer application) or another computer application to their computing device (say a smart phone or a tablet computer), as described in further detail hereinabove.

The computer executable instructions include a step of recording 610 information on content items and queries previously issued by at least one computer user (say a subscriber of the cloud based service), as described in further detail hereinabove.

The information associates each one of the previously issued queries with a respective at least one of the content items.

The association is based on context. Thus, a query may be associated with a specific content item previously presented to a computer user, if the computer user issues the query upon being presented the specific content item.

Optionally, when a content item (say a video or an article) is presented to the user, the user may choose to issue a query to a general user search engine like Google™, against files on the user's own computer, etc. Consequently, an add-on communicates information on the query and the content item in context of which the query is issued, to the network computer.

Optionally, the communicated information is recorded 610 in a dedicated database. The recorded 610 information associates between the content item presented to the computer user and the query issued by the computer user in the context of the presented content item.

For example, the information may associate a video interview with Ben Bernanke with queries previously issued by at least one user (say one or more of the subscribers), in context of presentation of the video interview, say with a query for specific stock exchange prices, a specific query on Bernanke's recent decisions, etc.

Further, the recorded 610 information may be indexed according to a variety of criterions, say by user name, IP address, geographical area, time of day, etc.

The computer executable instructions further include a step of receiving 620 data on a content item destined for a computer user.

In one example, the content item destined for the user is a content item received on the user's smart phone on which the add-on in installed, and the add-on sends data on the received content item, to the networked computer.

The data may include, but is not limited to: the content item itself, a selected part of the content item, bibliographic data of the content item, origin of the content item, a list of terms that appear in the content item, etc., or any combination thereof.

The computer executable instructions further include a step in which upon receipt 620 of the data on the content item, the received 620 data is used to find 630 a linkage between the received content item and one or more of the content items that the recorded 610 information associates with the previously issued queries, as described in further detail hereinabove.

The linkage may be based on one or more categories (say 'Nature', 'Football', etc.) that both content items are classifiable to, on terms common to both contents items, on bibliographic data (say author or magazine name) similarity between the content items, etc., or any combination thereof, as described in further detail hereinabove.

In a first example, the received content item is classified into a predefined category that a content item associated with one of the previously issued queries also belongs to, as a part of finding 430 the linkage, as described in further detail hereinabove.

In a second example, all content items that have at least a predefined number terms in common with the received content item, are found 630 to have the linkage with the received content item.

In a third example, there is measured term based similarity between the received content item and one (or more) of the content items associated with the queries, as a part of finding 630 the linkage between the two (or more) content items, as described in further detail hereinabove.

The computer executable instructions further include a step in which there are selected 640 one or more of the queries associated with the content items having the linkage with the received content item, for presentation to the computer user that the content item is destined for, as described in further detail hereinabove.

Optionally, as a part of the selection, the queries associated with the content items having the linkage, are ranked according to popularity among a population of computer users, say among subscribers of the cloud based service, as described in further detail hereinabove.

The popularity may be limited to a specific time frame (say the recent month or year) or not limited to a specific time frame. Then, there are selected 640 a predefined number of highest ranked ones of the queries for the presentation to the computer user that the content item is destined for, as described in further detail hereinabove.

Optionally, as a part of the selection, the queries associated with the content items having the linkage, are ranked, according to usage by the computer user that the content item is destined for. The usage may pertain to a specific time frame (say the recent month or year) or rather be not limited to a specific time frame.

In one example, the queries are ranked according to a number of times that the specific computer user issues the specific query in general, a number of times that the user issues the specific query when a specific content item associated with the query is presented to the specific user, etc., as described in further detail hereinabove. Then, there are selected 640 a predefined number of highest ranked ones of the queries for the presentation, as described in further detail hereinabove.

Optionally, as a part of the selection, the queries associated with the content items having the linkage, are ranked according to a count of occurrences of one (or more) terms of each one of the associated queries in all the associated queries.

That is to say that the queries may be ranked, by counting occurrences of one (or more) specific terms of each query associated with the content items having the linkage, in a population made of all the queries associated with the content items having the linkage.

The queries may be ranked according to a sum, an average, or any other score calculated using the count of the occurrences of the terms of each of the queries associated with the content items having the linkage, in the population of all the queries associated with the content items having the linkage. Then, there are selected 640 a predefined number of highest ranked ones of the queries for the presentation, as described in further detail hereinabove.

Optionally, as a part of the selection, any one of the queries that has less than a predefined number of terms in common with the received content item destined for the computer user, is filtered out, as described in further detail hereinabove.

Optionally, the computer executable instructions further include a step in which the selected 440 queries are presented together with the received content item, to the computer user that the content item is destined for. For example, the selected 640 queries may be presented in a search box positioned aside the content item that is presented to the user, as described in further detail hereinabove.

Optionally, the computer executable instructions further include a step in which computer user is allowed to forward one or more of the presented queries, to a search engine, as described in further detail hereinabove.

Figure 7:
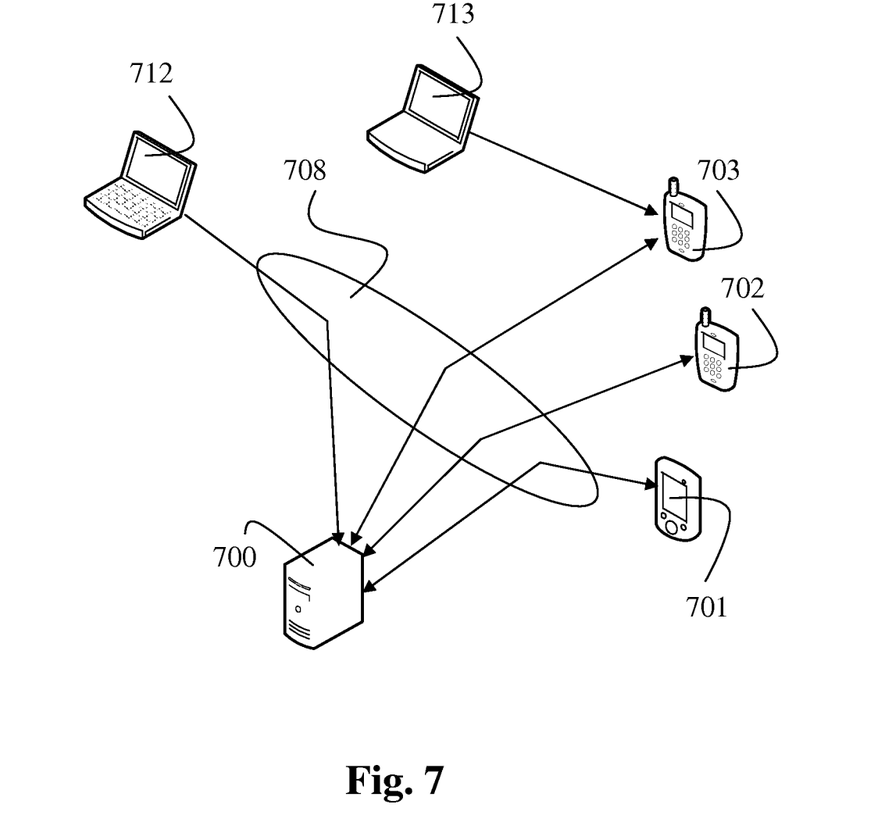
FIG. 7 is a simplified block diagram schematically illustrating an exemplary computing environment in which a cloud based service for enhancing content with queries, according to an exemplary embodiment of the present invention, may be implemented.

Reference is now made to FIG. 7, which is a simplified block diagram schematically illustrating an exemplary computing environment in which a cloud based service for enhancing content with queries, according to an exemplary embodiment of the present invention, may be implemented.

An exemplary computing environment in which a cloud based service for enhancing content with queries, according to an exemplary embodiment of the present invention is implemented, includes a networked computer 700.

The networked computer 700 may be a single computer or a group of computers, as described in further detail hereinabove.

On the networked computer 700, there are implemented the parts 210-240 of apparatus 2000, as described in further detail hereinabove and illustrated using FIG. 2.

Multiple computer users (say smart phone 702-703 or tablet computer 701 users) may subscribe to the cloud based service, and communicate with the networked computer 700, over a computer network 708, say a wide area networked such as the internet.

Optionally, the users subscribe to the service by downloading an add-on (an accessory program that extends capabilities of an existing computer application) or another computer application to their computing device 701-703, as described in further detail hereinabove.

In the cloud based service, a content item destined for a user of a computing device is automatically enhanced with one or more queries, as described in further detail hereinabove.

In one example, the content item is an item destined to a user of a smart phone 702, sent by a content provider 712 (say a provider of an RSS feed of content items, as known in the art) to the exemplary apparatus 2000 implemented on the networked computer 700, over the computer network 708.

The apparatus 2000 enhances the content item with selected queries, and sends the content item and the selected queries for presentation together, to the user's smart phone 702, as described in further detail hereinabove.

In a second example, the content item is received on a user's computing device, say a smart phone 703, from a content provider 713 (say by downloading directly from the content provider's 713 web site). The add-on implemented on the user's smart phone 703, sends data on the received content item, to the content data receiver 220 of apparatus 2000, over the network 708 (say internet), as described in further detail hereinabove.

The apparatus 2000 selects queries associated with the content item or with content items having linkage to the content item, and sends the selected queries for presentation together with the content item, to the user's smart phone 703, as described in further detail hereinabove.

Consequently, the queries may be presented to the computer user together with the content item (say by presenting the two, side by side, on a web page communicated to the computer user), thus potentially, providing the user with a personal content enrichment and increasing mobile application engagement.

It is expected that during the life of this patent many relevant devices and systems will be developed and the scope of the terms herein, particularly of the terms "Computer", "Tablet", "Smart Phone", "Cellular Phone", "Internet", "Intranet" and "Add-on", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method for enhancing content with queries, the method comprising steps the computer is programmed to perform, the steps comprising:
    on a networked computer, recording information on a plurality of previously encountered content items and previously issued queries, the information associating each one of the queries with a respective at least one of the previously encountered content items, the associated query being a search query previously issued by a computer user in context of the respective previously encountered content item associated with the search query;
    receiving data on a content item destined for a computer user; and
    selecting at least one of the queries associated with the previously encountered content items, for presentation with the content item destined for the computer user.

2. The method of claim 1, wherein said selecting comprises selecting at least one query amongst queries that the recorded information associates with the content item destined for the computer user.

3. The method of claim 1, wherein said selecting comprises:
    finding a linkage between the destined content item and at least one of the content items associated with queries; and
    selecting at least one of the queries associated with the content items having the linkage with the destined content item, for presentation to the computer user that the content item is destined for.

4. The method of claim 3, wherein said selecting further comprises ranking said queries associated with the content items having the linkage, according to popularity among computer users, and selecting a predefined number of highest ranked ones of the queries for said presentation.

5. The method of claim 3, wherein said selecting further comprises ranking said queries associated with the content items having the linkage, according to usage by the computer user that the content item is destined for, and selecting a predefined number of highest ranked ones of the queries for said presentation.

6. The method of claim 3, wherein said finding the linkage further comprises classifying the destined content item into a predefined category that the content item associated with the query also belongs to.

7. The method of claim 3, wherein said finding the linkage further comprises measuring term based similarity between the destined content item and the content item associated with the query.

8. The method of claim 3, wherein said selecting further comprises ranking the queries associated with the content items having the linkage, according to a count of occurrences of at least one term of each one of the associated queries in all the associated queries, and selecting a predefined number of highest ranked ones of the associated queries for said presentation.

9. The method of claim 1, wherein said selecting further comprises filtering out any one of the queries having less than a predefined number of terms in common with the destined content item.

10. The method of claim 1, further comprising presenting the selected queries together with the destined content item, to the computer user that the content item is destined for.

11. An apparatus for enhancing content with queries, the apparatus comprising:
    a networked computer;
    an information recorder, implemented on said networked computer, configured to record information on a plurality of previously encountered content items and previously issued queries, the information associating each one of the queries with a respective at least one of the previously encountered content items, the associated query being a search query previously issued by a computer user in context of the previously encountered respective content item associated with the search query;
    a content data receiver, in communication with said information recorder, configured to receive data on a content item destined for a computer user; and
    a query selector, in communication with said content data receiver, configured to select at least one of the queries associated with the previously encountered content items, for presentation with the content item destined for the computer user.

12. The apparatus of claim 11, wherein said query selector is further configured to select at least one query amongst queries that the recorded information associates with the content item destined for the computer user.

13. The apparatus of claim 11, further comprising:
    a linkage finder, in communication with said query selector, configured to find a linkage between the destined content item and at least one of the content items associated with queries, wherein said query selector is further configured to select at least one of the queries associated with the content items having the linkage with the destined content item, for presentation to the computer user that the content item is destined for.

14. The apparatus of claim 13, wherein said query selector is further configured to rank said queries associated with the content items having the linkage, according to popularity among computer users, and to select a predefined number of highest ranked ones of the queries for said presentation.

15. The apparatus of claim 13, wherein said query selector is further configured to rank said queries associated with the content items having the linkage, according to usage by the computer user that the content item is destined for, and to select a predefined number of highest ranked ones of the queries for said presentation.

16. The apparatus of claim 13, wherein said linkage finder is further configured to classify the destined content item into a predefined category that the content item associated with the query also belongs to.

17. The apparatus of claim 13, wherein said linkage finder is further configured to measure term based similarity between the destined content item and the content item associated with the query.

18. The apparatus of claim 13, wherein said query selector is further configured to rank the queries associated with the content items having the linkage, according to a count of occurrences of at least one term of each one of the associated queries in all the associated queries, and to select a predefined number of highest ranked ones of the associated queries for said presentation.

19. The apparatus of claim 11, wherein said query selector is further configured to filter out any one of the queries having less than a predefined number of terms in common with the destined content item.

20. The apparatus of claim 11, further comprising a query presenter, configured to present the selected queries together with the destined content item, to the computer user that the content item is destined for.

21. A computer readable medium storing computer executable instructions or performing steps of syndicated data stream content provisioning, the steps comprising:

- on a networked computer, recording information on a plurality of previously encountered content items and previously issued queries, the information associating each one of the queries with a respective at least one of the previously encountered content items, the associated query being a search query previously issued by a computer user in context of the respective previously encountered content item associated with the search query;
- receiving data on a content item destined for a computer user; and
- selecting at least one of the queries associated with the previously encountered content items, for presentation with the content item destined for the computer user.

* * * * *